Patented Oct. 19, 1948

2,451,869

UNITED STATES PATENT OFFICE 2,451,869

CATALYZED OXIDATION PROCESSES

John C. Rapean and William E. Ross, Berkeley, Calif., assignors to Shell Development Company, San Francisco, Calif., a corporation of Delaware No Drawing. Application October 10, 1944, Serial No. 558,281

11 Claims. (Cl. 260—610)

This invention relates to the controlled non-explosive oxidation of various organic compounds containing at least one replaceable hydrogen atom and more particularly pertains to an improved process for the obtaining of high yields of carboxylic acids, alcohols, ketones, organic hydroperoxides, and/or organic peroxides by the catalytic oxidation of organic compounds, particularly hydrocarbons and their halo-substituted derivatives. In one of its most specific embodiments, the invention is directed to the activation of surfaces of reactors employed for such catalytic oxidation of the organic compounds to produce the mentioned and other oxygenated compounds having either the same or twice the number of carbon atoms per molecule as the primary starting material treated. The invention is also directed to the process of effecting the mentioned controlled oxidation in such reactors the walls of which have been activated.

It has been discovered that carboxylic acids, ketones, alcohols, organic hydroperoxides and/or organic peroxides (i. e. compounds wherein two organic radicals are attached to the peroxy oxygen atoms) may be produced by subjecting organic compounds having at least one replaceable hydrogen atom to a partial and controlled oxidation in the presence of hydrogen bromide which catalyzes and controls the reaction. More specifically stated, it has been discovered that the above-mentioned and hereinbelow more fully described organic compounds may be subjected to a controlled non-explosive oxidation in the presence of a catalyst consisting of or comprising hydrogen bromide to produce high yields of the desired oxygenated products such as the carboxylic acids, ketones, organic hydroperoxides and/or organic peroxides containing at least the same number of carbon atoms per molecule as the starting organic material thus subjected to oxidation. For instance, U. S. patent application Serial No. 474,220, filed January 30, 1943, discloses and claims a process for the controlled partial and non-explosive oxidation of aliphatic and particularly saturated aliphatic hydrocarbons and of their products of partial halogenation to produce carboxylic acids and/or ketones having the same number of carbon atoms per molecule as the starting material treated. In accordance with the process disclosed and claimed in said application, this oxidation is effected by subjecting the stated saturated organic materials, e. g. ethane, propane or butane, as well as their products of halo-substitution, to the action of oxygen at an elevated temperature below that at which spontaneous combustion of the mixture occurs, this oxidation being effected in the presence of a catalyst comprising or consisting of hydrogen bromide. Also, U. S. patent application Serial No. 474,221, filed January 30, 1943, now abandoned, covers a process for the controlled, non-explosive oxidation of aromatic hydrocarbons and particularly of alkylated aromatic hydrocarbons to produce phenol, substituted phenols, aromatic carboxylic acids, ketones and the like having the same number of carbon atoms per molecule as the starting material, this oxidation being effected by subjecting the mentioned aryl or aralkyl hydrocarbons or their partially halogenated derivatives to the action of oxygen at an elevated temperature which is preferably above about 100° C. but below the temperature capable of causing spontaneous combustion and in the presence of hydrogen bromide employed as the catalyst. U. S. Patent No. 2,369,181, discloses and claims a similar process for the production of predetermined oxygenated products by the catalytic oxidation, under non-explosive conditions and in the presence of hydrogen bromide, of alicyclic hydrocarbons and of their halogenated derivatives, while U. S. Patent No. 2,395,523 covers a process for the production of novel organic peroxides and organic hydroperoxides by the controlled oxidation of isoparaffins such as isobutane, isopentane and the like. Similarly, U. S. Patent No. 2,369,-523, is directed to the production of certain unsaturated carboxylic acids and/or ketones by the controlled hydrogen bromide-catalyzed oxidation under non-explosive conditions of unsaturated organic compounds, e. g. unsaturated aliphatic hydrocarbons, while U. S. Patent No. 2,373,240, covers a process for the production of unsubstituted and halo-substituted unsaturated carboxylic acids by the controlled hydrogen bromide-catalyzed oxidation of halogenated unsaturated hydrocarbons. In all of these cases the controlled oxidation is effected in the presence of a catalyst consisting of or comprising hydrogen bromide which may be introduced as such into the reaction zone or formed in situ under the operating conditions employed.

The above-outlined inventions are predicated on the discovery that the presence of hydrogen bromide during the catalytic oxidation of the various organic compounds more fully described hereinbelow controls the oxidation reaction so that the oxidation occurs on the carbon atom or atoms to which a halogen atom, e. g. bromine atom, would normally attach itself if the starting material were to be subjected to a halo-substitution reaction. Also, it appears that the presence of the hydrogen bromide, besides retarding the explosion or complete combustion of the organic starting material, has the effect of inhibiting the decomposition of the carbon structure of the starting organic material so that the resultant oxygenated compound or compounds contain the same number of carbon atoms per molecule as the starting material treated.

Although the above-mentioned catalyzed oxidation may be effected at least in some instances in the liquid phase, it is generally preferable to maintain the reactants and the reaction product in the vapor phase. One method of effecting this reaction is to preheat the organic compound, oxygen or an oxygen-containing gas, and the hydrogen bromide to the desired or optimum temperature, either separately or after commingling, and then conveying the vaporous mixture through a reaction zone maintained at the desired or optimum reaction temperature, the rate of throughput being regulated so as to maintain the reactants in contact with the catalyst in said reaction zone for a period of time sufficient to cause the interaction and formation of the desired oxygenated products. Although the oxidation reaction may be effected in reactors constructed of or lined with various materials which do not catalyze any undesirable side reactions, it is generally preferable to provide the reactor at least with an inner lining of a "hard" glass such as Pyrex glass, which is a borosilicate glass.

It has been noted that when the oxidation reaction described herein is effected in the mentioned reactors (even when such reactors are made of or lined with, for example, Pyrex glass), it is frequently difficult if not impossible to obtain reproducible results. This is true even when new reactors are employed. It has also been found that reactions of the above-described character frequently stop, so that the mixture leaving the reaction zone contains substantially none, or only negligible amounts, of the desired oxygenated products. This is particularly true when in the course of an oxidation reaction a minor or mild explosion occurs within the reaction zone. Without any intention of being limited by any theory of the case, it is believed that the above-mentioned controlled oxidation reactions are at least initiated at the surface of the walls and that said surfaces may be or may become inactive so as to materially decrease or even totally inhibit the initiation of the chain reaction mechanism which apparently causes the conversion of the starting materials into the desired oxygenated compounds.

It is therefore an object of the present invention to avoid the above and other defects and to provide a process whereby the walls of the reactors employed for the hydrogen bromide-catalyzed oxidation reactions may be initially activated and/or may be repeatedly reactivated so that the reactors may be economically employed for the manufacture of oxygenated compounds in accordance with the above-mentioned process.

It has now been discovered that the above and other objects may be attained by treating the walls of the mentioned reactor with certain inorganic oxygen-containing compounds of nitrogen. More specifically stated, it has been discovered that high yields of the desired oxygenated organic products are obtainable and that readily reproducible results are attainable when the inner walls of reactors in which the above outlined hydrogen bromide-catalyzed oxidation of organic compounds is effected are treated with inorganic oxygen-containing acids of nitrogen and/or with nitrogen oxides, particularly nitric acid and/or nitrogen dioxide ($NO_2$). Furthermore, it was found that it is possible to reactivate the walls of reactors, which have been rendered inactive for one reason or another, by the above-mentioned treatment with said inorganic oxygen-containing acids of nitrogen and/or with nitrogen oxides. Therefore the present invention also includes the process of periodically interrupting the hydrogen bromide-catalyzed oxidation of organic compounds for the purpose of treating the reactor with the above-mentioned acids and/or oxides, such periodic treatment reactivating the inner walls of the reactor and thus permitting the obtainment of high yields of desired oxygenated products. The use of the hereinabove-mentioned and hereinbelow more fully described treatment is not limited only to the activation of the walls of new reactors or to the reactivation of the walls of reactors which have been rendered totally inactive due to mild explosions, etc. It has been noted that in some cases the yield of the desired oxygenated products obtained during the mentioned hydrogen bromide-catalyzed oxidation gradually decreases with continued operation. This may be explained by a partial inactivation of the reactor wall surfaces. In such cases it is advisable to interrupt the catalyzed oxidation prior to complete or substantially complete inactivation or poisoning of the reactor walls to effect the mentioned treatment with nitrogen oxides and/or the mentioned acids, so as to permit the attainment of high yields of oxygenated compounds after such treatment.

The present process of activating and/or reactivating the wall surfaces is to be used with hydrogen bromide-catalyzed oxidations of all organic compounds which contain at least one replaceable hydrogen atom. The invention is applicable and effective in processes involving the controlled oxidation of aliphatic hydrocarbons, particularly saturated aliphatic hydrocarbons, as well as aromatic hydrocarbons, alkylated aromatic hydrocarbons, alicyclic hydrocarbons, which may or may not contain one or more saturated or unsaturated aliphatic side chains, as well as of their derivatives such as the products of their partial halo-substitution. Also, various other organic derivatives, e. g. nitriles, ketones, acids, etc., fall within the class of organic compounds that may be employed as the starting material; for example, methyl ethyl ketone may be converted to diacetyl by the mentioned hydrogen bromide-catalyzed oxidation. A particularly suitable class of organic compounds, which may be subjected to the hydrogen bromide-catalyzed, controlled oxidation in reactors which have been activated or reactivated in accordance with the present invention, comprise the straight-chain and branched-chain organic compounds such as the straight-chain and branched-chain saturated aliphatic hydrocarbons and their products of partial halo-substitution. Representative organic compounds of the class that may be oxidized in the mentioned activated reactors include: the straight-chain and branched-chain saturated aliphatic hydrocarbons of the type of ethane, propane, butanes, pentanes, hexanes, heptanes, octanes and the like; the alicyclic hydrocarbons such as cycloparaffins of the type of cyclobutane, cyclopentane, cyclohexane and their higher homologs; the alkylated cycloparaffins such as methyl cyclopentane, methyl cyclohexane and the like;

the aryl, aralkyl and alkaryl hydrocarbons such as naphthalene, toluene, xylenes, ethyl benzene, n-propyl benzene, butyl benzenes, cumene and the like; and the partially halo-substituted derivatives of the mentioned and like hydrocarbons, e. g. ethyl chloride, dichlorethane, dibrompropanes, monochlorbutanes, monobrombutanes, dichlorbutanes, monochlorcyclopentane, benzyl chloride, benzyl bromide, and their homologs and analogs. Also, the corresponding unsaturated hydrocarbons and halo-substituted derivatives thereof are included together with other derivatives of the above-defined class of organic compounds which may be used as the starting materials. As mentioned, the branched-chain saturated aliphatic hydrocarbons, such as isobutane and its homologs and the halo-substituted derivatives thereof, are compounds especially suitable for the controlled hydrogen bromide-catalyzed oxidation in reactors which have been treated in accordance with the process of the present invention with the oxygen compounds of nitrogen.

It has been stated that the activation of the reactor walls is effected by treatment with certain oxygenated compounds of nitrogen, i. e. inorganic oxygen-containing acids of nitrogen and/or nitrogen oxides such as nitrogen monoxide, dioxide or pentoxide. Of these, the treatments with nitric acid and/or with nitrogen dioxide ($NO_2$) have been found to be particularly suitable. Generally speaking, activation of even completely deactivated wall surfaces may be effected by a mere washing with nitric acid. Another effective method of conditioning new reactor walls or regenerating reactor walls which have been inactivated consists of contacting such walls with nitrogen dioxide at elevated temperatures, particularly temperatures of above about 200° C. A particularly suitable method for such activation comprises passing nitrogen dioxide vapors, with or without added oxygen, through the reactor while maintaining therein a temperature of between about 250° C. and about 400° C., preferably between about 275° C. and about 325° C. this passage of the nitrogen dioxide being preferably continued for several hours, depending on the degree of inactivation, the temperature employed during the treatment, the rate of throughput of the nitrogen dioxide and the presence or absence of free oxygen. In some instances highly satisfactory results have been obtained when the reactor to be activated was first contacted with nitric acid, followed by the passage of nitrogen oxide through the interior of such reactor at the above-mentioned elevated temperatures, such as 300° C. It is to be noted that the treatment of the reactor walls with the mentioned compounds, besides improving the overall activity of the wall surfaces and thereby permitting the obtaining of high yields of the desired oxygenated products, possesses still another advantage, even when previously unused reactors are subjected to such treatment. It has been noticed that the use of even new reactors for the hydrogen bromide-catalyzed oxidation of the various organic compounds results in relatively prolonged induction periods. For instance, when isobutane is subjected to the action of oxygen in the presence of hydrogen bromide at the specified elevated temperatures, e. g. between about 160° C. and 185° C., only relatively small amounts of desired organic peroxides such as tertiary butyl hydroperoxide and/or di(tertiary butyl) peroxide are obtained at the beginning of such oxidation run, the yield gradually increasing until a maximum is reached, said maximum depending on the other operating conditions. It has been found that a pretreatment of the reactor or the treatment of an inactivated reactor in accordance with the process of the present invention greatly decreases the above-mentioned induction period so that high yields of the desired oxygenated products are obtainable within a very short period after the initiation of the oxidation reaction.

The following examples are illustrative of the process of the present invention and disclose the advantages derived from the treatment of reactor wall surfaces in accordance with said process. It is to be understood, however, that there is no intention of being limited to any specific details presented in these examples.

*Example I*

The reactor employed in this run consisted of a Pyrex glass tube which was about 33 inches long and had an internal diameter of 3.1 cm. This tube was first employed for the hydrogen bromide-catalyzed oxidation of isobutane in which equivolumetric amounts of isobutane and oxygen, together with 6 mol percent of hydrogen bromide, were conveyed through the reaction tube under pressure of 1 atmosphere and a temperature of about 165° C. at such a rate that the contact time was equal to about three minutes. This reaction resulted in the production of high yields of tertiary butyl hydroperoxide. After several hours of such use, a mild explosion was deliberately produced in the reactor. This was effected by increasing the hydrogen bromide concentration to approximately 13 mol percent and by raising the temperature. As a result of the mild explosion, the reactor was rendered inactive so that substantially no organic peroxides were formed thereafter. The passage of the above reactants was therefore discontinued and nitrogen dioxide was conveyed through the reactor for several hours, first at a temperature of about 165° C. and then at between about 275° C. and 325° C. This treatment was continued for slightly over four hours, at the end of which the tube was used again for the oxidation of isobutane to tertiary butyl hydroperoxide under the conditions specified above. It was found that with an oxidation temperature of about 161° C.–163° C. the total consumption of oxygen and isobutane rose to about 90% within about one-half hour from the start of the oxidation run, and that high yields of the desired tertiary butyl hydroperoxide were obtained thereafter for several hours without the necessity of further treating the reactor walls.

*Example II*

The reactor consisted of a Pyrex glass tube which was 30 inches long and had an internal diameter of 3.7 cm. The walls of this reactor were inactive by a mild explosion, whereupon nitrogen dioxide vapors were conveyed therethrough at an oil-bath temperature of about 280° C. for about three hours. Thereafter an equivolumetric mixture of oxygen and isobutane, which mixture also contained 6 mol percent of hydrogen bromide, was conveyed through the reactor at a pressure of about 1 atmosphere and at such a rate that the reaction time was equal to about three minutes. The reaction temperature was maintained at about 162° C. It was found that the total consumption of gases following the mentioned nitrogen dioxide treatment was equal to about 90%, even after about 7 hours of continuous oxidation under these conditions.

Example III

A previously unused Pyrex glass tube having an internal diameter of 3.7 cm. and a length of 30 inches was washed with nitric acid and then rinsed with water. Thereafter equivolumetric amounts of isobutane and oxygen together with 6 mol percent of hydrogen bromide, were conveyed through the reactor at a pressure of 1 atmosphere and with a contact time of 3 minutes, the reaction temperature being maintained at 162° C. It was found that with such pretreatment the total gas consumption reached approximately 85% and higher within slightly over one-half hour from the start of the oxidation run. An analysis of the reaction products indicated that the yield of tertiary butyl hydroperoxide and di(tertiary butyl) peroxide was especially satisfactory.

Example IV

A previously unused and unannealed Pyrex glass tube 11 feet in length and having an internal diameter of 2.1 cm. was first washed with nitric acid, this treatment being then followed by the passage of nitrogen dioxide therethrough at a temperature of 290° C. The thus treated reactor was employed for the hydrogen bromide-catalyzed oxidation of isobutane in which equivolumetric amounts of isobutane and oxygen, together with 6 mol percent of hydrogen bromide, were conveyed through the reactor at a pressure of 1 atmosphere and a temperature of 160° C. The contact time for the first 2¾ hours was equal to four minutes, after which the throughput was increased so as to maintain the contact time at about three minutes. Within less than one hour from the start of the oxidation reaction the total consumption of gases was higher than 85%, this consumption being maintained for several hours of continuous oxidation treatment.

Although the above examples have shown the advantages of the claimed process with particular reference to the oxidation of isobutane to produce organic peroxides of the type of tertiary butyl hydroperoxide and di(tertiary butyl) peroxide, substantially the same advantages are obtained when reactors treated in accordance with the claimed invention are used for the hydrogen bromide-catalyzed oxidation of other organic compounds, e. g. hydrocarbons, disclosed above. For instance, the treatment of reactor walls with the mentioned acids and/or oxides of nitrogen in accordance with the process of the present invention may be effectively realized both before and during the use of the reactor for the hydrogen bromide-catalyzed oxidation of isopentane as well as of straight-chain saturated aliphatic hydrocarbons such as propane and butane and their homologs and analogs.

Also, although the above examples have shown the advantages of the claimed process with particular reference to the treatment of Pyrex glass reactors which are employed for the hydrogen bromide-catalyzed oxidation, the invention is not limited to the treatment of this type of reactor, since the treatment in accordance with the process of the present invention is equally applicable to the walls of reactors made of or lined with other substances.

We claim as our invention:

1. In a process for the production of peroxidic compounds selected from the group consisting of tertiary butyl hydroperoxide, di(tertiary butyl) peroxide and mixtures thereof, the steps of continuously conveying a vaporous mixture comprising substantially equivolumetric vaporous amounts of isobutane and oxygen and a volumetric amount of hydrogen bromide equal to about one half that of the isobutane through a reaction vessel having inner surfaces of a hard glass, maintaining said reactants in the reaction vessel at a temperature of about 200° C. at a superatmospheric pressure and for a period of time sufficient to effect the oxidation of the isobutane to said peroxidic compounds, and periodically interrupting said oxidation step to reactivate the reaction vessel walls by subjecting them, at a temperature of between about 275° C. and about 325° C., to the action of nitrogen dioxide.

2. In a process for the production of peroxidic compounds selected from the group consisting of tertiary butyl hydroperoxide, di(tertiary butyl) peroxide and mixtures thereof, the steps of continuously conveying a vaporous mixture comprising substantially equivolumetric vaporous amounts of isobutane and oxygen and a volumetric amount of hydrogen bromide equal to about one half that of the isobutane through a reaction vessel having inner surfaces of a hard glass, maintaining said reactants in the reaction vessel at a temperature of about 200° C., at a superatmospheric pressure and for a period of time sufficient to effect the oxidation of the isobutane to said peroxidic compounds, and periodically interrupting said oxidation step to reactivate the reaction vessel wall surfaces by contacting them with nitric acid.

3. In a process for the production of peroxidic compounds selected from the group consisting of tertiary butyl hydroperoxide, di(tertiary butyl) peroxide and mixtures thereof, the steps of continuously conveying a vaporous mixture comprising substantially equivolumetric vaporous amounts of isobutane and oxygen and a volumetric amount of hydrogen bromide equal to about one half that of the isobutane through a reaction vessel having inner surfaces of a hard glass, maintaining said reactants in the reaction vessel at a temperature of about 200° C., at a superatmospheric pressure and for a period of time sufficient to effect the oxidation of the isobutane to said peroxide compounds, and periodically interrupting said oxidation step to reactivate the reaction vessel wall surfaces by contacting them with nitric acid and by subjecting the thus contacted surface to the action of nitrogen dioxide at a temperature of between about 250° C. and about 400° C.

4. In a process for producing peroxidic compounds selected from the group consisting of tertiary butyl hydroperoxide, di(tertiary butyl) peroxide and mixtures thereof, the steps of reacting a vaporous mixture of isobutane and oxygen, at a superatmospheric pressure and at a temperature of between about 100° C. and the temperature at which spontaneous combustion of the mixture occurs, in the presence of hydrogen bromide, and effecting the reaction in a vessel the wall surfaces of which are a hard glass and have been activated by contacting them with nitrogen dioxide at a temperature of between about 250° C. and about 400° C.

5. In a process for the production of peroxidic compounds selected from the group consisting of tertiary butyl hydroperoxide, di(tertiary butyl) peroxide and mixtures thereof, the steps of reacting a vaporous mixture of isobutane and oxygen, at a temperature of between about 100° C. and the temperature at which spontaneous combustion of the mixture occurs, in the presence of hydrogen bromide, and effecting the reaction in a vessel the wall surfaces of which are a hard glass and have been activated by contacting them with nitric acid.

6. In a process for the production of peroxidic compounds selected from the group consisting of tertiary butyl hydroperoxide, di(tertiary butyl) peroxide and mixtures thereof, the steps of reacting a vaporous mixture of isobutane and oxygen, at a temperature of between about 100° C. and the temperature at which spontaneous combustion of the mixture occurs, in the presence of hydrogen bromide, and effecting the reaction in a vessel the wall surfaces of which are a hard glass and have been activated by contacting them with an inorganic oxygen-containing acid of nitrogen.

7. In a process for the production of peroxidic compounds, the steps of subjecting a vaporous mixture comprising oxygen and a saturated aliphatic hydrocarbon containing a tertiary carbon atom to the action of hydrogen bromide, at a temperature of between about 100° C. and the temperature at which spontaneous combustion of the mixture occurs, and effecting said reaction in a vessel the walls of which are a hard glass and have been treated with an oxide of nitrogen.

8. In a process for the production of organic peroxides, the steps of subjecting a vaporous mixture comprising oxygen and a saturated aliphatic hydrocarbon containing a tertiary carbon atom, to the action of hydrogen bromide, at an elevated temperature which is below the spontaneous combustion temperature of the mixture, effecting said reaction in a reaction vessel the inner walls of which are a hard glass and have been treated with an oxide of nitrogen, conducting said reaction for a period of time sufficient to cause the controlled catalytic oxidation of the hydrocarbon employed, and recovering the peroxidic compounds from the resultant mixture.

9. In a process for the controlled oxidation of aliphatic hydrocarbons, the steps of subjecting vapors of an aliphatic hydrocarbon having at least two carbon atoms to the molecule to the action of oxygen, in the presence of hydrogen bromide and at an elevated temperature which is below that at which spontaneous combustion occurs, and effecting said reaction in a reaction vessel the wall surfaces of which are a hard glass and have been treated with an oxide of nitrogen.

10. In a process for the production of peroxidic compounds selected from the group consisting of tertiary butyl hydroperoxide, di(tertiary butyl) peroxide and mixtures thereof, the steps of continuously conveying a vaporous mixture comprising substantially equivolumetric vaporous amounts of isobutane and oxygen and a volumetric amount of hydrogen bromide equal to about one half that of the isobutane through a reaction vessel of Pyrex glass, maintaining said reactants in the reaction vessel at a temperature of about 200° C., at a superatmospheric pressure and for a period of time sufficient to affect the oxidation of the isobutane to said peroxidic compounds, and periodically interrupting said oxidation step to reactivate the reaction vessel walls by subjecting them, at a temperature of between about 275° C. and about 325° C. to the action of nitrogen dioxide.

11. In a process for the controlled oxidation of aliphatic hydrocarbons the steps of subjecting vapors of a saturated aliphatic hydrocarbon containing at least two carbon atoms to the action of hydrogen bromide at an elevated temperature which is below that at which spontaneous combustion occurs, and effecting such reaction in a reaction vessel the wall surfaces of which are a hard glass and have been treated with an oxygenated compound of nitrogen of the group consisting of the inorganic oxygen-containing acids of nitrogen and the oxides of nitrogen.

JOHN C. RAPEAN.
WILLIAM E. ROSS.

REFERENCES CITED

The following references are of record in the file of this patent:

UNITED STATES PATENTS

| Number | Name | Date |
| --- | --- | --- |
| 1,547,725 | Bibb | July 28, 1925 |
| 1,549,022 | Otte | Aug. 11, 1925 |
| 2,236,906 | Hodge | Apr. 1, 1941 |
| 2,270,175 | Tadema | Jan. 13, 1942 |
| 2,365,851 | Thomas | Dec. 26, 1944 |
| 2,369,181 | Rust | Feb. 13, 1945 |
| 2,369,182 | Rust | Feb. 13, 1945 |
| 2,395,523 | Vaughan | Feb. 26, 1945 |

OTHER REFERENCES

Bibb et al., "Ind. & Eng. Chem.," vol. 21, pages 633-38 (1929).